United States Patent
Tomita et al.

(10) Patent No.: US 9,701,835 B2
(45) Date of Patent: Jul. 11, 2017

(54) POLYCARBONATE RESIN COMPOSITION FOR THIN OPTICAL COMPONENT, AND THIN OPTICAL COMPONENT

(71) Applicant: MITSUBISHI ENGINEERING-PLASTICS CORPORATION, Minato-ku (JP)

(72) Inventors: Keisuke Tomita, Hiratsuka (JP); Susumu Matsumoto, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 2 days.

(21) Appl. No.: 14/894,671

(22) PCT Filed: Jun. 3, 2014

(86) PCT No.: PCT/JP2014/064717
§ 371 (c)(1),
(2) Date: Nov. 30, 2015

(87) PCT Pub. No.: WO2015/011994
PCT Pub. Date: Jan. 29, 2015

(65) Prior Publication Data
US 2016/0122533 A1    May 5, 2016

(30) Foreign Application Priority Data

Jul. 26, 2013 (JP) .................. 2013-155539
Mar. 6, 2014 (JP) .................. 2014-043838
Apr. 11, 2014 (JP) .................. 2014-081958

(51) Int. Cl.
B32B 27/32 (2006.01)
C08L 69/00 (2006.01)
G02B 1/04 (2006.01)
F21V 8/00 (2006.01)

(52) U.S. Cl.
CPC .............. *C08L 69/00* (2013.01); *G02B 1/045* (2013.01); *G02B 6/0065* (2013.01)

(58) Field of Classification Search
CPC ................. C08L 69/00; G02B 1/045
USPC ....................................................... 428/220
See application file for complete search history.

(56) References Cited

U.S. PATENT DOCUMENTS

| | | | |
|---|---|---|---|
| 5,187,211 A * | 2/1993 | Lundy | C08K 5/06 524/107 |
| 6,066,398 A * | 5/2000 | Ueda | B29C 45/0001 264/1.33 |
| 6,941,057 B1 | 9/2005 | Okamoto et al. | |
| 2009/0185363 A1* | 7/2009 | Ishikawa | C08L 69/00 362/97.1 |
| 2012/0309874 A1* | 12/2012 | Takimoto | C08G 65/20 524/120 |
| 2014/0364546 A1* | 12/2014 | Okamoto | B29B 9/12 524/109 |

FOREIGN PATENT DOCUMENTS

| | | |
|---|---|---|
| CN | 101193981 A | 6/2008 |
| JP | S64-22959 | 1/1989 |
| JP | H07-052272 | 2/1995 |
| JP | H09-227785 | 2/1997 |
| JP | H11-035692 | 2/1999 |
| JP | 11-158364 | 6/1999 |
| JP | 2000-234052 | 8/2000 |
| JP | 2001-208917 | 8/2001 |
| JP | 2001-215336 | 8/2001 |
| JP | 4069364 | 4/2008 |
| JP | 2013-000913 | 1/2013 |
| JP | 2013-139097 | 7/2013 |
| JP | 2013-231899 | 11/2013 |
| WO | 2011-083635 A1 | 7/2011 |

OTHER PUBLICATIONS

Combined Office Action and Search Report issued Jul. 19, 2016 in Chinese Patent Application No. 201480042499.0 (with English translation of Categories of Cited Documents, previously filed).
International Search Report Issued Aug. 5, 2014 in PCT/JP14/64717 Filed Jun. 3, 2014.
Combined Office Action and Search Report issued Jul. 19, 2016 in Chinese Patent Application No. 201480042499.0 (with English translation of Categories of Cited Documents).

* cited by examiner

*Primary Examiner* — Hui Chin
(74) *Attorney, Agent, or Firm* — Oblon, McClelland, Maier & Neustadt, L.L.P.

(57) ABSTRACT

A polycarbonate resin composition for a thin optical component is provided, which has a high transmittance and a good hue and an excellent resistance to thermal discoloration, and a thin optical component is also provided. The polycarbonate resin composition for a thin optical component comprising, per 100 mass parts of a polycarbonate resin (A), 0.1 to 2 mass parts of a polyalkylene ether glycol compound (B) represented by general formula (1) and 0.005 to 0.5 mass parts of a phosphorus stabilizer (C).

[Chemical1]

$$X-O\text{-}(\text{-}CH_2\text{-})_m\text{-}O\text{-}]_n\text{-}Y \qquad (1)$$

12 Claims, 1 Drawing Sheet

POLYCARBONATE RESIN COMPOSITION FOR THIN OPTICAL COMPONENT, AND THIN OPTICAL COMPONENT

TECHNICAL FIELD

The present invention relates to a polycarbonate resin composition for thin optical components and to thin optical components, and particularly relates to a polycarbonate resin composition for thin optical components that has a high transmittance and a good hue, to thin optical components made by the molding the same, to a method of producing thin optical components, to polycarbonate resin pellets for thin optical components, and to a method of producing polycarbonate resin pellets for thin optical components.

BACKGROUND ART

A planar light source device is incorporated in the liquid-crystal display devices used in, for example, personal computers, cell phones, and so forth, in order to respond to demands for greater thinness, lighter weight, greater labor savings, and higher definition. In addition, with the goal of functioning to uniformly and efficiently guide the incident light to the liquid-crystal display side, this planar light source device is provided with a flat plate-shaped light guide plate or a light guide plate that has a wedge-shaped cross-section in which one surface has a uniformly sloped surface. In some instances a concave-convex pattern is also formed in the surface of the light guide plate in order to provide a light scattering function.

Such light guide plates are obtained by the injection molding of a thermoplastic resin, and the aforementioned concave-convex pattern is generated by transfer from a concave-convex region formed in the surface of an insert. Light guide plates have in the past been molded from a resin material such as polymethyl methacrylate (PMMA); however, of late a conversion has been underway to the more highly heat-resistant polycarbonate resin materials due to the trends of demand for display devices that render sharper images and the higher temperatures within the device caused by the heat generated in proximity to the light source.

Polycarbonate resins exhibit excellent mechanical properties, thermal properties, and electrical properties and an excellent weatherability; however, they have a lower light transmittance than PMMA and the problem thus arises of a lower brightness when a planar light source assembly is constructed of a light source and a polycarbonate resin light guide plate. In addition, there has lately been demand for a small chromaticity difference between the incident light area of the light guide plate and locations distant from the incident light area, but a problem here is that polycarbonate resin more readily undergoes yellowing than does PMMA resin.

A method is proposed in Patent Document 1 in which the light transmittance and brightness are improved by the addition of an acrylic resin and an alicyclic epoxy; a method is proposed in Patent Document 2 in which the brightness is improved by modifying the polycarbonate resin terminals and raising the transferability of the concave-convex region to the light guide plate; and a method is proposed in Patent Document 3 in which the brightness is improved by improving this transferability by introducing a copolyester carbonate that has an aliphatic segment.

However, in the case of the method in Patent Document 1, while the addition of the acrylic resin does bring about a good hue, the light transmittance and brightness cannot be raised due to the appearance of cloudiness. The addition of alicyclic epoxy may improve the transmittance, but a hue-improving effect is not recognized for this. In the case of the methods in Patent Document 2 and Patent Document 3, an improvement in the flowability and transferability can be expected, but the problem occurs of a reduction in the heat resistance.

On the other hand, the incorporation of, for example, a polyethylene ether glycol or a poly(2-methyl)ethylene ether glycol in thermoplastic resins such as polycarbonate resins is known, and Patent Document 4 describes a γ-radiation resistant polycarbonate resin that contains same, while Patent Document 5 describes a thermoplastic resin composition that is provided by incorporating same in, for example, PMMA, and that has an excellent static inhibition and an excellent surface appearance.

Patent Document 6 proposes that the transmittance and hue be improved through the incorporation of a polyethylene ether glycol or poly(2-alkyl)ethylene ether glycol with the formula $X-O-[CH(-R)-CH_2-O]_n-Y$ (R is the hydrogen atom or a $C_{1-3}$ alkyl group). Some improvement in the transmittance and yellowing (yellow index: YI) is seen due to the incorporation of the polyethylene ether glycol or poly(2-alkyl)ethylene ether glycol.

However, the trends toward further thinning and thinning in large sizes have in particular been developing quite rapidly recently with regard to various mobile terminals such as smartphones and tablet type terminals, and light injection into the light guide plate has been carried out from the lateral edge of the light guide plate rather than from the back of the light guide plate and a satisfactory brightness has come to be required from ultrathin light sources. In such high-end light guide plates, the transmittance and YI level achieved by the above-described prior art do not satisfy the required specifications.

In addition, because, in the case of polycarbonate resins for light guide applications, thin-wall molding is carried out at higher temperatures than ordinary molding temperature of polycarbonate resins, higher fluidities by reducing the viscosity-average molecular weight are requested even at the sacrifice of the mechanical strength. Polycarbonate resins for thin optical components, as represented by these light guides, are thus materials with a weaker mechanical strength than conventional polycarbonate resins, and as a result during pellet production with an extruder, the extruded polycarbonate resin strand ends up being prone to breakage during cooling and the problem arises that stable production is impaired.

Moreover, the produced pellets are introduced at the plant into, e.g., paper bags or flexible containers for delivery, and even during transport alone a portion is converted into fines due to pellet-to-pellet contact. When pellets containing such fines are used for the molding of, for example, a light guide, the problem then arises that yellowing and optical fluctuations are readily occurred in the molded article.

With regard to solving the problems caused by fines, it can be solved by removing the fines by passage through a fines-removal device during the molding process. However, this creates a contamination risk due to the introduction of an extra step, and thus there is a desire to avoid this as much as possible.

In order to prevent the generation of silver streaks in optical discs, Patent Document 7 provides a polycarbonate resin pellet for optical disc applications, for which the average value of the pellet length is in the range from 2.5 to 3.5 mm and at least 70% thereof is in the range of the average value of the length±0.1 mm. This document states that such pellet with little fine powder avoids incorporating air during plasticization and that an optical disc substrate free of silver streak is obtained; however, no description is provided with regard to the shape of these pellets.

In order to achieve a shortening of the molding cycle for optical disc substrates, Patent Document 8 provides a polycarbonate molding material for optical disc substrates, characterized in that the average value of the pellet length is in the range from 2.5 to 3.5 mm, the average value of the major diameter of the ellipse cross-section is 2.60 to 3.2 mm, and at least 70% of the pellets reside in the range of the average value of the length±0.08 mm and in the range of the average value of the major diameter±0.12 mm. This document states that, by having the length and major diameter of the pellets be in the indicated ranges, a three-dimensional shape is obtained in which the ratio between the length and major diameter takes on a balanced condition of approximately 0.7 to 1.5 and its distribution resides within a specified and narrow range and because of this a very uniform shape is assumed. It is further stated that as a result the shape is better adapted to the structure of the cylinder and screw of the injection molding machine used for discs and the melting efficiency during plasticization is raised, the plasticization time is then shortened, and the production of optical disc substrates by what is known as high-cycle molding, which has a short molding cycle, is made possible. While another characteristic feature in Patent Document 8 is that the pellet mass has a uniform shape, there is no description of the details of the elliptical shape of the individual pellets, and in addition only production by simply cutting the strand is described with regard to the specific method of producing these pellets.

In addition, as in the inventions described in these Patent Documents 7 and 8, minimizing the fines in the pellet mass is also critical for thin optical components such as light guides, but this by itself is not sufficient for polycarbonate resin pellets for thin optical components in which the occurrence of yellowing and optical fluctuations is suppressed.

CITATION LIST

Patent Literature

[Patent Document 1]: Japanese Patent Application Laid-open No. H11-158364
[Patent Document 2]: Japanese Patent Application Laid-open No. 2001-208917
[Patent Document 3]: Japanese Patent Application Laid-open No. 2001-215336
[Patent Document 4]: Japanese Patent Application Laid-open No. H1-22959
[Patent Document 5]: Japanese Patent Application Laid-open No. H9-227785
[Patent Document 6]: Japanese Patent No. 4,069,364
[Patent Document 7]: Japanese Patent Application Laid-open No. H07-52272
[Patent Document 8]: Japanese Patent Application Laid-open No. H11-035692

SUMMARY OF INVENTION

Technical Problem

The present invention was pursued in view of the circumstances described above, and an object of the present invention is to provide a polycarbonate resin composition for thin optical components, that presents no loss whatsoever of the properties of the polycarbonate resin itself and that exhibits a good transmittance and hue.

The present invention also provides a polycarbonate resin pellet for thin optical components for which the occurrence of yellowing and optical fluctuations in the molded article is suppressed as a result of making possible the molding of a light guide using a low mechanical strength, low molecular weight polycarbonate resin that has been processed into a shape that generates a relatively small amount of fines even when the pellets are in contact with each other. The present invention further provides a method for stably producing such a pellet.

Solution to Problem

As a result of intensive and extensive investigations in order to achieve the aforementioned objects, the present inventors discovered that a better transmittance, a good hue, and a very good resistance to thermal discoloration can be achieved by incorporating, in a polycarbonate resin, a specific polyalkylene ether glycol in a specific amount and a phosphorus stabilizer in a specific amount.

In the production of pellets from such a polycarbonate resin composition, the stable production of pellets for thin optical components was also made possible by flattening the cross-sectional shape of the strand at the time of extrusion and thereby endowing the strand with elasticity and suppressing breakage during cooling. It was additionally discovered that conversion into fines by pellet-to-pellet contact can be suppressed by having the pellet shape after pelletization be a specific flat shape, and as a result it was discovered that pellets are provided that are superior for thin optical components, e.g., light guides, for which the occurrence of yellowing and optical fluctuations in the molded article has been suppressed.

The present invention provides, as described below, a polycarbonate resin composition for thin optical components, a thin optical component, a method of producing a thin optical component, a polycarbonate resin pellet for thin optical components, and a method of producing a polycarbonate resin pellet for thin optical components.

[1] A polycarbonate resin composition for thin optical components comprising, per 100 mass parts of a polycarbonate resin (A), 0.1 to 2 mass parts of a polyalkylene ether glycol compound (B) represented by general formula (1) and 0.005 to 0.5 mass parts of a phosphorus stabilizer (C).

[Chemical 1]

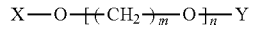

(1)

wherein, X and Y each are a hydrogen atom or a $C_{1-22}$ aliphatic acyl group or alkyl group and X and Y may differ from one another; m is an integer from 3 to 6; and n is an integer from 6 to 100.

[2] The polycarbonate resin composition for thin optical components according to [1], further containing 0.0005 to 0.2 mass parts of an epoxy compound (D), wherein the mass ratio (C)/(D) between the contents of the phosphorus stabilizer (C) and the epoxy compound (D) is 0.5 to 10.

[3] The polycarbonate resin composition for thin optical components according to [1] or [2], wherein the viscosity-average molecular weight (Mv) of the polycarbonate resin (A) is 10,000 to 15,000.

[4] The polycarbonate resin composition for thin optical components according to any one of [1] to [3], wherein the viscosity-average molecular weight (Mv) of the polycarbonate resin (A) is 11,000 to 14,500.

[5] The polycarbonate resin composition for thin optical components according to any one of [1] to [4], wherein the polyalkylene ether glycol compound (B) is a polytetramethylene ether glycol.

[6] The polycarbonate resin composition for thin optical components according to any one of [1] to [5], wherein the phosphorus stabilizer (C) is a stabilizer having a pentaerythritol diphosphite structure.

[7] The polycarbonate resin composition for thin optical components according to any one of [1] to [6], wherein spectral transmittance at a wavelength of 420 nm measured at an optical path-length of 300 mm is at least 55%.

[8] A thin optical component obtained by molding the polycarbonate resin composition according to any one of [1] to [7].

[9] The thin optical component according to [8], comprising a light guide plate having a thickness of not more than 1 mm.

[10] A method of producing a thin optical component having a wall thickness of not more than 1 mm, comprising injection molding the polycarbonate resin composition according to any one of [1] to [7] at 305° C. to 380° C.

[11] A polycarbonate resin pellet for thin optical components, comprising an elliptical column-shaped pellet formed from the polycarbonate resin composition according to any one of [1] to [7], and having a length of 2.0 to 5.0 mm, a major diameter/minor diameter ratio for an elliptical cross-section of 1.5 to 4, and a minor diameter of 1.0 to 3.0 mm.

[12] The polycarbonate resin pellet for thin optical components according to [11], wherein, an amount of fines having a particle diameter of not more than 1 mm generated by the polycarbonate resin pellets after rotation for 20 minutes at a rotation rate of 30 rpm, when 500 g of the polycarbonate resin pellet is filled in a hermetically sealed 2 liter-capacity polyethylene container having an outer diameter of 125 mm and a total height of 233 mm, and filled with 500 g of the polycarbonate resin pellets and the container is held in a 50 liter tumbler and is rotated, is not more than 50 ppm.

[13] The polycarbonate resin pellet for thin optical components according to [11] or [12], wherein the major diameter/minor diameter ratio of a cross-sectional ellipse of the pellet is 1.8 to 4.

[14] A method of producing a polycarbonate resin pellet for thin optical components according to any one of [11] to [13], comprising:

extruding a polycarbonate resin having a viscosity-average molecular weight of 10,000 to 15,000 from a extruding nozzle having an elliptically-shaped die orifice and disposed at an end of an extruder, as a strand with the major diameter part of the ellipse cross-section being placed in an approximately horizontal state;

cooling and solidifying the same in a cooling water bath; and cutting the same with a strand cutter.

[15] The method of producing a polycarbonate resin pellet for thin optical components according to [14], wherein, when a strand taking-up speed is 100 mm/sec and a height difference in height between supports supporting the strand is 290 mm, a distance between supports which are at the same height, at which distance strand-breakage does not occur during continuous operation for 1 hour or more, is equal to or less than 300 mm.

Advantageous Effect of Invention

The present invention can provide a polycarbonate resin composition for thin optical components, that presents no loss whatsoever of the properties of the polycarbonate resin itself and that exhibits a good transmittance and hue and a good resistance to thermal discoloration. The present invention can also provide thin optical components that exhibit a good transmittance and hue, and in particular the present invention can be favorably used for thin optical components as typified by light guide plates.

The polycarbonate resin pellet of the present invention, notwithstanding its low viscosity-average molecular weight of 10,000 to 15,000, is resistant to conversion into fines by pellet-to-pellet contact and as a result is superior as a pellet for thin optical components, e.g., light guides, for which the occurrence of yellowing and optical fluctuations in the molded article is suppressed. In addition, pellets for thin optical components can be stably produced by flattening the cross-sectional shape of the strand at the time of extrusion during pellet production and thereby endowing the strand with elasticity and suppressing breakage during cooling.

DESCRIPTION OF EMBODIMENTS

Figure 1:
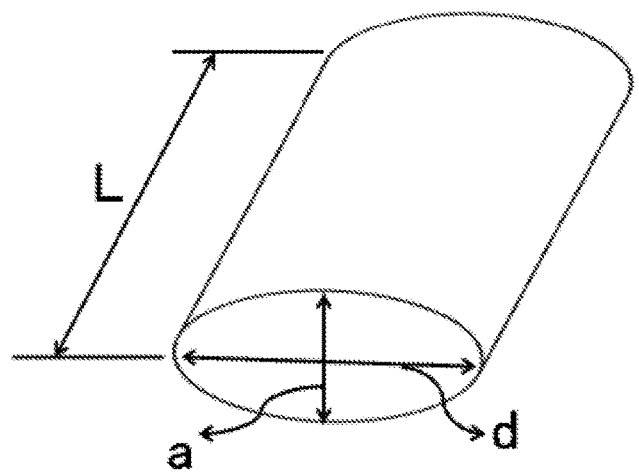
FIG. 1 is a schematic view of the polycarbonate resin pellet for thin optical components of the present invention.

The present invention is particularly described below through, inter alia, embodiments and illustrative materials.

In this Description, unless specifically indicated otherwise, the "to" in a numerical value range is used in the sense that the numerical values provided before and after the "to" are included as the lower limit value and the upper limit value.

[Summary]

The polycarbonate resin composition for thin optical components of the present invention comprises, per 100 mass parts of a polycarbonate resin (A), 0.1 to 2 mass parts of a polyalkylene ether glycol compound (B) represented by the general formula (1) given above and 0.005 to 0.5 mass parts of a phosphorus stabilizer (C).

Each of the components, etc., constituting the polycarbonate resin composition of the present invention is described in detail herebelow.

[Polycarbonate Resin (A)]

There is no limitation on the species of polycarbonate resin used in the present invention, and a single species of polycarbonate resin may be used or any combination of two or more species in any proportions may be used.

Polycarbonate resins are polymers with a basic structure that has the carbonate bond and is given by the formula —[—O—X—O—C(=O)—]—.

X in the formula is generally a hydrocarbon, and an X that incorporates a heteroatom or heterobond may be used in order to provide various properties.

The polycarbonate resins can be classified into aromatic polycarbonate resins, in which the carbons directly bonded to the carbonate bond are each aromatic carbons, and aliphatic polycarbonate resins, in which they are aliphatic carbons, and either can be used. Aromatic polycarbonate resins are preferred here from the standpoint of the heat resistance, mechanical properties, and electrical properties.

There are no limitations on the specific species of polycarbonate resin, and it can be exemplified by the polycarbonate polymers obtained by the reaction of a carbonate precursor with a dihydroxy compound. A polyhydroxy compound or the like may also be reacted here in addition to the dihydroxy compound and carbonate precursor. A method may also be used in which carbon dioxide is reacted as the carbonate precursor with a cyclic ether. The polycarbonate polymer may be straight chain or may be a branched chain. The polycarbonate polymer may be a homopolymer composed of a single repeating unit or may be a copolymer having two or more repeating units. This copolymer can be selected from various copolymerization types, e.g., random copolymers, block copolymers, and so forth. These polycarbonate polymers are generally thermoplastic resins.

Among the monomers that are starting materials for aromatic polycarbonate resins, the aromatic dihydroxy compounds can be exemplified by the following:

dihydroxybenzenes such as 1,2-dihydroxybenzene, 1,3-dihydroxybenzene (i.e., resorcinol), and 1,4-dihydroxybenzene;

dihydroxybiphenyls such as 2,5-dihydroxybiphenyl, 2,2'-dihydroxybiphenyl, and 4,4'-dihydroxybiphenyl;

dihydroxynaphthalenes such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene, and 2,7-dihydroxynaphthalene;

dihydroxydiaryl ethers such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene, and 1,3-bis(4-hydroxyphenoxy)benzene;

bis(hydroxyaryl)alkanes such as 2,2-bis(4-hydroxyphenyl)propane (i.e., bisphenol A), 1,1-bis(4-hydroxyphenyl)propane, 2,2-bis(3-methyl-4-hydroxyphenyl)propane, 2,2-bis(3-methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(3,5-dimethyl-4-hydroxyphenyl)propane, 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,3-bis[2-(4-hydroxyphenyl)-2-propyl]benzene, bis(4-hydroxyphenyl)methane, bis(4-hydroxyphenyl)cyclohexylmethane, bis(4-hydroxyphenyl)phenylmethane, bis(4-hydroxyphenyl)(4-propenylphenyl)methane, bis(4-hydroxyphenyl)diphenylmethane, bis(4-hydroxyphenyl)naphthylmethane, 1,1-bis(4-hydroxyphenyl)ethane, 1,1-bis(4-hydroxyphenyl)-1-phenylethane, 1,1-bis(4-hydroxyphenyl)-1-naphthylethane, 1,1-bis(4-hydroxyphenyl)butane, 2,2-bis(4-hydroxyphenyl)butane, 2,2-bis(4-hydroxyphenyl)pentane, 1,1-bis(4-hydroxyphenyl)hexane, 2,2-bis(4-hydroxyphenyl)hexane, 1,1-bis(4-hydroxyphenyl)octane, 2,2-bis(4-hydroxyphenyl)octane, 4,4-bis(4-hydroxyphenyl)heptane, 2,2-bis(4-hydroxyphenyl)nonane, 1,1-bis(4-hydroxyphenyl)decane, and 1,1-bis(4-hydroxyphenyl)dodecane;

bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,3-dimethylcyclohexane, 1,1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butylcyclohexane, 1,1-bis(4-hydroxyphenyl)-4-tert-butylcyclohexane, 1,1-bis(4-hydroxyphenyl)-3-phenylcyclohexane, and 1,1-bis(4-hydroxyphenyl)-4-phenylcyclohexane;

cardo structure-containing bisphenols such as 9,9-bis(4-hydroxyphenyl)fluorene and 9,9-bis(4-hydroxy-3-methylphenyl)fluorene;

dihydroxydiaryl sulfides such as 4,4'-dihydroxydiphenyl sulfide and 4,4'-dihydroxy-3,3'-dimethyldiphenyl sulfide;

dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

Among the preceding, the bis(hydroxyaryl)alkanes are preferred and among them the bis(4-hydroxyphenyl)alkanes are preferred, while 2,2-bis(4-hydroxyphenyl)propane (i.e., bisphenol A) is particularly preferred from the standpoints of the impact resistance and heat resistance.

A single aromatic dihydroxy compound may be used or any combination of two or more in any proportions may be used.

The monomers that are starting materials for aliphatic polycarbonate resins can be exemplified by the following: alkanediols such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol, and decane-1,10-diol;

cycloalkanediols such as cyclopentane-1,2-diol, cyclohexane-1,2-diol, cyclohexane-1,4-diol, 1,4-cyclohexanedimethanol, 4-(2-hydroxyethyl)cyclohexanol, and 2,2,4,4-tetramethylcyclobutane-1,3-diol;

glycols such as ethylene glycol, 2,2'-oxydiethanol (i.e., diethylene glycol), triethylene glycol, propylene glycol, and spiroglycol;

aralkyl diols such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl) ether, and bisphenol S bis(2-hydroxyethyl) ether; and cyclic ethers such as 1,2-epoxyethane (i.e., ethylene oxide), 1,2-epoxypropane (i.e., propylene oxide), 1,2-epoxycyclopentane, 1,2-epoxycyclohexane, 1,4-epoxycyclohexane, 1-methyl-1,2-epoxycyclohexane, 2,3-epoxynorbornane, and 1,3-epoxypropane.

Carbonyl halides, carbonate esters, and so forth are examples of the carbonate precursors among the monomers that are starting materials for polycarbonate resins. A single carbonate precursor may be used or any combination of two or more in any proportions may be used.

The carbonyl halides can be specifically exemplified by phosgene and by haloformates such as the bischloroformates of dihydroxy compounds and the monochloroformates of dihydroxy compounds.

The carbonate esters can be specifically exemplified by diaryl carbonates such as diphenyl carbonate and ditolyl carbonate; dialkyl carbonates such as dimethyl carbonate and diethyl carbonate; and carbonates of dihydroxy compounds, e.g., biscarbonates of dihydroxy compounds, monocarbonates of dihydroxy compounds, and cyclic carbonates.

Method of Polycarbonate Resin Production

There are no particular limitations on the method of producing the polycarbonate resin and any method can be used. Examples thereof are the interfacial polymerization method, melt transesterification method, pyridine method, ring-opening polymerization of a cyclic carbonate compound, and solid-state transesterification of a prepolymer.

Those methods that are particularly advantageous among these methods are specifically described in the following.

Interfacial Polymerization Method

The production of polycarbonate resin by an interfacial polymerization method will be described first.

In an interfacial polymerization method, a dihydroxy compound and a carbonate precursor (preferably phosgene) are reacted in the presence of a reaction-inert organic solvent and an aqueous alkali solution generally while holding the pH at 9 or above, and the polycarbonate resin is obtained by subsequently carrying out an interfacial polymerization in the presence of a polymerization catalyst. As necessary, the reaction system may contain a molecular weight modifier (terminating agent) and may contain an oxidation inhibitor in order to inhibit oxidation of the dihydroxy compound.

The dihydroxy compound and carbonate precursor are as described above. The use of phosgene is preferred among the carbonate precursors, and the method using phosgene is then known in particular as a phosgene method.

The reaction-inert organic solvent can be exemplified by chlorinated hydrocarbons such as dichloromethane, 1,2-dichloroethane, chloroform, monochlorobenzene, and dichlorobenzene, and by aromatic hydrocarbons such as benzene, toluene, and xylene. A single organic solvent may be used or any combination of two or more organic solvents in any proportions may be used.

The alkali compound in the aqueous alkali solution can be exemplified by alkali metal compounds such as sodium hydroxide, potassium hydroxide, lithium hydroxide, and sodium bicarbonate and by alkaline-earth metal compounds, whereamong sodium hydroxide and potassium hydroxide are preferred. A single alkali compound may be used or any combination of two or more alkali compounds in any proportions may be used.

There are no limitations on the concentration of the alkali compound in the aqueous alkali solution, and generally 5 to 10 mass % is used in order to control the pH in the aqueous alkali solution during the reaction to 10 to 12. In addition, for example, in order to control the pH of the aqueous phase to 10 to 12 and preferably 10 to 11 during phosgene injection, the molar ratio between the bisphenol compound and the alkali compound is generally 1:at least 1.9 and preferably 1:at least 2.0 and is generally 1:not more than 3.2 and preferably 1:not more than 2.5.

The polymerization catalyst can be exemplified by aliphatic tertiary amines such as trimethylamine, triethylamine, tributylamine, tripropylamine, and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzylammonium chloride, tetramethylammonium chloride, and triethylbenzylammonium chloride; pyridine; guanine; and guanidine salts. A single polymerization catalyst may be used or any combination of two or more polymerization catalysts in any proportions may be used.

The molecular weight modifier can be exemplified by monohydric aromatic phenols that have a phenolic hydroxyl group, aliphatic alcohols such as methanol and butanol, mercaptan, and phthalimide, among which the aromatic phenols are preferred. These aromatic phenols can be specifically exemplified by alkyl group-substituted phenols such as m-methylphenol, p-methylphenol, m-propylphenol, p-propylphenol, p-tert-butylphenol, and p-(long chain alkyl)-substituted phenol; vinyl group-containing phenols such as isopropenylphenol; epoxy group-containing phenols; and carboxyl group-containing phenols such as o-hydroxybenzoic acid and 2-methyl-6-hydroxyphenylacetic acid. A single molecular weight modifier may be used or any combination of two or more molecular weight modifiers in any proportions may be used.

The amount of use of the molecular weight modifier, expressed per 100 moles of the dihydroxy compound, is generally at least 0.5 moles and is preferably at least 1 mole and is generally not more than 50 moles and is preferably not more than 30 moles. The thermal stability and hydrolysis resistance of the resin composition can be enhanced by having the amount of use of the molecular weight modifier be in the indicated range.

The mixing sequence for the reaction substrates, reaction medium, catalyst, additives, and so forth during the reaction may be freely selected as long as the desired polycarbonate resin is obtained, and the sequence may be freely established as appropriate. For example, when phosgene is used as the carbonate precursor, the molecular weight modifier may be admixed at any time from the reaction between the dihydroxy compound and the phosgene (phosgenation) up to and including the point at which the polymerization reaction is begun.

The reaction temperature is generally 0 to 40° C., and the reaction time is generally several minutes (for example, 10 minutes) to several hours (for example, 6 hours).

Melt Transesterification Method

The production of the polycarbonate resin by the melt transesterification method will now be described.

For example, a transesterification reaction between a carbonate diester and a dihydroxy compound is carried out in the melt transesterification method.

The dihydroxy compound is as described above.

The carbonate diester, on the other hand, can be exemplified by dialkyl carbonate compounds such as dimethyl carbonate, diethyl carbonate, and di-tert-butyl carbonate; diphenyl carbonate; and substituted diphenyl carbonates such as ditolyl carbonate. Among these, diphenyl carbonate and substituted diphenyl carbonates are preferred and in particular diphenyl carbonate is more preferred. A single carbonate diester may be used or any combination of two or more carbonate diesters in any proportions may be used.

Any ratio between the dihydroxy compound and carbonate diester may be used as long as the desired polycarbonate resin is obtained, but preferably the carbonate diester is used in at least an equimolar amount per 1 mole of the dihydroxy compound, while the use of at least 1.01 moles per 1 mole of the dihydroxy compound is more preferred. The upper limit is generally 1.30 moles or less. Using this range makes it possible to adjust the amount of hydroxyl terminal group into a suitable range.

The amount of terminal hydroxyl group in a polycarbonate resin tends to exercise a major influence on, inter alia, the thermal stability, hydrolysis stability, and color. Due to this, as necessary the amount of terminal hydroxyl group may be adjusted by any known method. A polycarbonate resin having an adjusted amount of terminal hydroxyl group can be obtained in general by adjustment or control of, for example, the mixing ratio between the carbonate diester and the aromatic dihydroxy compound and/or the depth of the vacuum during the transesterification reaction. The molecular weight of the obtained polycarbonate resin can also generally be adjusted by these processes.

The previously indicated mixing ratio applies when the amount of terminal hydroxyl group is adjusted through adjustment of the mixing ratio between the carbonate diester and dihydroxy compound.

In addition, a separate admixture of the terminating agent may be carried out during the reaction in a more aggressive adjustment method. The terminating agent here can be exemplified by monohydric phenols, monobasic carboxylic acids, and carbonate diesters. A single terminating agent may be used or any combination of two or more terminating agents in any proportions may be used.

A transesterification catalyst is generally used in the production of polycarbonate resin by the melt transesterification method. Any transesterification catalyst can be used. Among transesterification catalysts, for example, the use of alkali metal compounds and/or alkaline-earth metal compounds is preferred. In combination therewith, for example, a basic compound, e.g., a basic boron compound, basic phosphorus compound, basic ammonium compound, or an amine compound, may also be used on an auxiliary basis. A single transesterification catalyst may be used or any combination of two or more transesterification catalysts in any proportions may be used.

The reaction temperature in the melt transesterification method is generally 100 to 320° C. The pressure during the reaction is generally a vacuum of 2 mmHg or below. The specific process may be the execution of a melt polycondensation reaction under the indicated conditions while removing by-products, for example, an aromatic hydroxy compound.

The melt polycondensation reaction can be carried out by a batch method or a continuous method. In the case of the batch method, the mixing sequence for the reaction substrates, reaction medium, catalyst, additives, and so forth may be freely selected as long as the desired aromatic polycarbonate resin is obtained, and the sequence may be freely established as appropriate. The melt polycondensation reaction, however, is preferably carried out using a continuous regime based on a consideration of the stability of the polycarbonate resin.

A catalyst deactivator may also be used on an optional basis in the melt transesterification method. Any compound that can neutralize the transesterification catalyst can be used as the catalyst deactivator. Examples here are sulfur-containing acidic compounds and their derivatives. A single catalyst deactivator may be used or any combination of two or more catalyst deactivators in any proportions may be used.

The amount of use of the catalyst deactivator, expressed with reference to the alkali metal or alkaline-earth metal present in the transesterification catalyst, is generally at least 0.5 equivalents and preferably at least 1 equivalent and is generally not more than 10 equivalents and is preferably not more than 5 equivalents. In addition, it is generally at least 1 ppm and generally not more than 100 ppm and preferably not more than 20 ppm, with reference to the polycarbonate resin.

The molecular weight of the polycarbonate resin (A), expressed as the viscosity-average molecular weight (Mv) derived from the solution viscosity measured at a temperature of 25° C. using methylene chloride as the solvent, is preferably 10,000 to 15,000 and is more preferably at least 10,500, even more preferably at least 11,000, particularly at least 11,500, and most preferably at least 12,000, and is more preferably not more than 14,500. Having the viscosity-average molecular weight be at least the lower limit value for the indicated range can bring about additional enhancements in the mechanical strength of the polycarbonate resin composition of the present invention. Having the viscosity-average molecular weight be not more than the upper limit value for the indicated range can better restrain reductions in the fluidity of the polycarbonate resin composition of the present invention and can also raise the moldability and facilitate the execution of thin-wall molding.

A mixture of two or more polycarbonate resins having different viscosity-average molecular weights may be used, in which case a polycarbonate resin having a viscosity-average molecular weight outside the preferred range given above may be admixed.

The viscosity-average molecular weight [Mv] here refers to the value calculated using Schnell's viscosity equation, i.e., $\eta = 1.23 \times 10^{-4} \, Mv^{0.83}$, wherein the intrinsic viscosity $[\eta]$ (unit: dl/g) at 20° C. is determined using methylene chloride as the solvent and using a Ubbelohde viscometer. The intrinsic viscosity $[\eta]$ is the value calculated using the following formula and the specific viscosity $[\eta_{sp}]$ at each solution concentration [C] (g/dl).

$$\eta = \lim_{c \to 0} \eta_{sp}/c \qquad \text{[Mathematical 1]}$$

The concentration of the terminal hydroxyl groups in the polycarbonate resin may be freely selected and may be determined by selection as appropriate, but will generally be not more than 1,000 ppm and is preferably not more than 800 ppm and more preferably not more than 600 ppm. This makes it possible to bring about additional improvements in the residence heat stability and color of the polycarbonate resin. In addition, the lower limit here—particularly for polycarbonate resin produced by the melt transesterification method—is generally at least 10 ppm and is preferably at least 30 ppm and more preferably at least 40 ppm. This makes it possible to suppress reductions in the molecular weight and to bring about additional improvements in the mechanical properties of the resin composition.

The unit for the terminal hydroxyl group concentration is the mass of the terminal hydroxyl groups expressed as ppm with reference to the mass of the polycarbonate resin. The measurement method here is colorimetric determination by the titanium tetrachloride/acetic acid method (the method described in Macromol. Chem., 88 215 (1965)).

The polycarbonate resin may be used in the form of polycarbonate resin proper (this polycarbonate resin proper is not limited to an embodiment that contains only a single species of polycarbonate resin, but is used, for example, in the sense of including embodiments that contain a plurality of polycarbonate resin species having different monomer compositions or molecular weights from one another) or may be used in combination with an alloy (mixture) of a polycarbonate resin and another thermoplastic resin. Moreover, it may be structured as a copolymer in which polycarbonate resin is the major portion, for example, as a copolymer of a polycarbonate resin with a siloxane structure-containing oligomer or polymer, with the goal of raising the flame retardancy and impact resistance still further; as a copolymer of a polycarbonate resin with a phosphorus atom-containing monomer, oligomer, or polymer, with the goal of raising the thermal oxidation stability and flame retardancy still further; as a copolymer of a polycarbonate resin with a dihydroxyanthraquinone structure-bearing monomer, oligomer, or polymer, with the goal of improving the thermal oxidation stability; as a copolymer of a polycarbonate resin with an oligomer or polymer having an olefinic structure, e.g., polystyrene, in order to improve the optical properties; or as a copolymer of a polycarbonate resin with a polyester resin oligomer or polymer with the goal of enhancing the chemical resistance.

In addition, the polycarbonate resin may contain a polycarbonate oligomer in order to bring about an improved appearance for the molded article and improve the fluidity. The viscosity-average molecular weight [Mv] of this polycarbonate oligomer is generally at least 1,500 and is preferably at least 2,000 and is generally not more than 9,500 and is preferably not more than 9,000. The incorporated polycarbonate oligomer is preferably not more than 30 mass % of the polycarbonate resin (including the polycarbonate oligomer).

Moreover, the polycarbonate resin need not be only a virgin raw material, but may also be a polycarbonate resin that has been regenerated from post-consumer products (what is known as material-recycled polycarbonate resin).

However, regenerated polycarbonate resin preferably is not more than 80 mass % of the polycarbonate resin and is more preferably not more than 50 mass % thereof. Since regenerated polycarbonate resin has a high potential for deterioration, e.g., thermal deterioration, aged deterioration, and so forth, the use of such a polycarbonate resin in amounts larger than the indicated range creates the possibility of a decline in the color and mechanical properties.

[Polyalkylene Ether Glycol Compound (B)]

The polycarbonate resin composition for thin optical components of the present invention contains a polyalkylene ether glycol compound (B) represented by the following general formula (1).

[Chemical 2]

(1)

wherein, X and Y each are the hydrogen atom or a $C_{1-22}$ aliphatic acyl group or alkyl group and X and Y may differ from one another; m is an integer from 3 to 6; and n is an integer from 6 to 100.

The n (degree of polymerization) in general formula (1) is an integer from 6 to 100 and is preferably at least 8 and is more preferably at least 10 and is preferably not more than 90 and is more preferably not more than 80. A degree of polymerization n of less than 6 is unfavorable because gas is then produced during molding. A degree of polymerization n in excess of 100, on the other hand, is unfavorable because the compatibility is then reduced.

The polyalkylene ether glycol compound (B) may be a copolymer with another copolymerization component, but is preferably a polyalkylene ether glycol homopolymer.

Preferred examples of the polyalkylene ether glycol compound (B) are, with X and Y in formula (1) being the hydrogen atom, polytrimethylene ether glycol, in which m is 3; polytetramethylene ether glycol, in which m is 4; polypentamethylene ether glycol in which m is 5; and polyhexamethylene ether glycol in which m is 6; while polytrimethylene ether glycol and polytetramethylene ether glycol are more preferred and polytetramethylene ether glycol and its esters and ethers are particularly preferred.

In addition, the exhibition of the properties of the polyalkylene ether glycol compound (B) is not influenced by the termination of one or both terminals thereof with a fatty acid or an alcohol, and thus the ethers and fatty acid esters can be used in the same manner and X and/or in formula (1) may be an aliphatic acyl group having 1 to 22 carbons or an alkyl group having 1 to 22 carbons.

A straight-chain or branched fatty acid ester may be used as the fatty acid ester, and the fatty acid constituting the fatty acid ester may be a saturated fatty acid or an unsaturated fatty acid. Moreover, a fatty acid may be used in which a portion of the hydrogen atom has been substituted by a substituent such as, for example, the hydroxyl group.

The fatty acid constituting the fatty acid ester is a $C_{1-22}$ mono- or di-fatty acid, for example, a monosaturated fatty acid, e.g., formic acid, acetic acid, propionic acid, butyric acid, valeric acid, caproic acid, enanthoic acid, caprylic acid, capric acid, lauric acid, myristic acid, pentadecanoic acid, palmitic acid, heptadecanoic acid, stearic acid, nonadecanoic acid, arachidic acid, and behenic acid; or a monounsaturated fatty acid, e.g., oleic acid, elaidic acid, linoleic acid, linolenic acid, and arachidonic acid; or a difatty acid having at least 10 carbons, e.g., sebacic acid, undecanedioic acid, dodecanedioic acid, tetradecanedioic acid, thapsic acid, decenedioic acid, undecenedioic acid, and dodecenedioic acid.

A single one of these fatty acids may be used or a combination of two or more may be used. These fatty acids also include fatty acids that have one or a plurality of hydroxyl groups in the molecule.

The following are preferred specific examples of the polyalkylene ether glycol fatty acid esters: polyalkylene ether glycol monopalmitate ester, polyalkylene ether glycol dipalmitate ester, polyalkylene ether glycol monostearate ester, polyalkylene ether glycol distearate ester, polyalkylene ether glycol (i.e., monopalmitate monostearate) ester, and polyalkylene ether glycol behenate.

The alkyl group constituting the alkyl ether may be straight chain or branched and is a $C_{1-22}$ alkyl group, for example, methyl group, ethyl group, propyl group, butyl group, octyl group, lauryl group, stearyl group, and so forth, wherein the alkyl methyl ether, ethyl ether, butyl ether, lauryl ether, stearyl ether, and so forth, of the polyalkylene ether glycol are preferred examples.

The number-average molecular weight of the polyalkylene ether glycol compound (B) is preferably 200 to 5,000 and is more preferably at least 300 and even more preferably at least 500 and is more preferably not more than 4,000 and even more preferably not more than 3,000. Exceeding the upper limit on the indicated range is unfavorable because the compatibility then declines, while going below the lower limit on the indicated range is unfavorable because gas is then produced during molding.

The number-average molecular weight referenced here for the polyalkylene ether glycol compound is the number-average molecular weight calculated based on the hydroxyl number measured in accordance with JIS K1577.

The content of the polyalkylene ether glycol compound (B), expressed per 100 mass parts of the polycarbonate resin (A), is 0.1 to 2 mass parts. The content is preferably at least 0.15 mass parts and more preferably at least 0.2 mass parts and preferably not more than 1.9 mass parts, more preferably not more than 1.7 mass parts, and even more preferably not more than 1.6 mass parts. The improvement in the hue and yellowing is not satisfactory when the content is below 0.1 mass parts. At above 2 mass parts, strand scission occurs frequently during melt-kneading with an extruder and the production of pellets of the resin composition is strongly impeded.

[Phosphorus Stabilizer (C)]

The polycarbonate resin composition of the present invention necessarily contains a phosphorus stabilizer. The incorporation of a phosphorus stabilizer causes the polycarbonate resin composition to have an excellent hue and also improves the resistance to thermal discoloration.

Any known phosphorus stabilizer can be used as the phosphorus stabilizer. Specific examples here are the oxo acids of phosphorus, e.g., phosphoric acid, phosphonic acid, phosphorous acid, phosphinic acid, and polyphosphoric acid; acidic pyrophosphate metal salts, e.g., sodium acid pyrophosphate, potassium acid pyrophosphate, and calcium acid pyrophosphate; the phosphates of a Group I or Group IIB metal, e.g., potassium phosphate, sodium phosphate, cesium phosphate, and zinc phosphate; and also phosphate compounds, phosphite compounds, and phosphonite compounds, wherein phosphite compounds are particularly preferred. A polycarbonate resin composition having a higher resistance to discoloration and a better continuous production capability is obtained by the selection of a phosphite compound.

This phosphite compound is a trivalent phosphorus compound with the general formula $P(OR)_3$ wherein R is a monovalent or divalent organic group.

These phosphite compounds can be exemplified by triphenyl phosphite, tris(mononoylphenyl) phosphite, tris(mononoyl/dinonyl-phenyl) phosphite, tris(2,4-di-tert-butylphenyl) phosphite, monooctyl diphenyl phosphite, dioctyl monophenyl phosphite, monodecyl diphenyl phosphite, didecyl monophenyl phosphite, tridecyl phosphite, trilauryl phosphite, tristearyl phosphite, distearyl pentaerythritol diphosphite, bis(2,4-di-tert-butyl-4-methylphenyl) pentaerythritol diphosphite, bis(2,6-di-tert-butylphenyl) octyl phosphite, 2,2-methylenebis(4,6-di-tert-butylphenyl) octyl phosphite, tetrakis(2,4-di-tert-butylphenyl)-4,4'-biphenylene diphosphite, and 6-[3-(3-tert-butyl-hydroxy-5-methylphenyl)propoxy]-2,4,8,10-tetra-tert-butyldibenzo[d,f][1,3,2]dioxaphosphepine.

Among these phosphite compounds, aromatic phosphite compounds with general formula (2) or (3) below are more preferred in order to effectively increase the resistance to thermal discoloration by the polycarbonate resin composition of the present invention.

[Chemical 3]

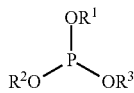

(2)

In formula (2), $R^1$, $R^2$, and $R^3$ each are independently a $C_{6-30}$ aryl group.

[Chemical 4]

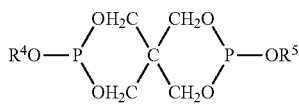

(1)

[In formula (3), $R^4$ and $R^5$ each are independently a $C_{6-30}$ aryl group.]

Among the phosphite compounds given by formula (2), triphenyl phosphite, tris(mononoylphenyl) phosphite, tris(2,4-di-tert-butylphenyl) phosphite, and so forth are preferred wherein tris(2,4-di-tert-butylphenyl) phosphite is more preferred. These organophosphite compounds can be specifically exemplified by "Adeka Stab 1178" from ADEKA Corporation, "Sumilizer TNP" from Sumitomo Chemical Co., Ltd., "JP-351" from Johoku Chemical Co., Ltd., "Adeka Stab 2112" from ADEKA Corporation, "Irgafos 168" from BASF, and "JP-650" from Johoku Chemical Co., Ltd.

Among the phosphite compounds given by formula (3), those having a pentaerythritol diphosphite structure, such as bis(2,4-di-tert-butyl-4-methylphenyl) pentaerythritol diphosphite, bis(2,6-di-tert-butyl-4-methylphenyl) pentaerythritol diphosphite, and bis(2,4-dicumylphenyl) pentaerythritol diphosphite, are particularly preferred. Specific preferred examples of these organophosphite compounds are "Adeka Stab PEP-24G" and "Adeka Stab PEP-36" from ADEKA Corporation and "Doverphos S-9228" from Dover Chemical Corporation.

A single phosphorus stabilizer may be incorporated or any combination of two or more in any proportions may be incorporated.

The content of the phosphorus stabilizer (C), per 100 mass parts of the polycarbonate resin (A), is 0.005 to 0.5 mass parts and is preferably at least 0.007 mass parts, more preferably at least 0.008 mass parts, and particularly preferably at least 0.01 mass parts and is preferably not more than 0.4 mass parts, more preferably not more than 0.3 mass parts, even more preferably not more than 0.2 mass parts, and particularly not more than 0.1 mass parts. The hue and resistance to thermal discoloration are unsatisfactory when the content of the phosphorus stabilizer (C) is less than the 0.005 mass parts of this range. When the content of the phosphorus stabilizer (C) exceeds 0.5 mass parts, not only does the resistance to thermal discoloration deteriorate instead, but the moist thermal stability also declines.

[Epoxy Compound (D)]

The polycarbonate resin composition of the present invention preferably additionally contains an epoxy compound (D). The incorporation of an epoxy compound brings about an even better hue for the polycarbonate resin composition of the present invention as well as additional improvements in the resistance to thermal discoloration.

Compounds that have one or more epoxy groups in each molecule are used as the epoxy compound (D). Preferred specific examples are phenyl glycidyl ether, allyl glycidyl ether, t-butyl phenyl glycidyl ether, 3,4-epoxycyclohexylmethyl 3',4'-epoxycyclohexylcarboxylate, 3,4-epoxy-6-methylcyclohexylmethyl 3',4'-epoxy-6'-methylcyclohexylcarboxylate, 2,3-epoxycyclohexylmethyl 3',4'-epoxycyclohexylcarboxylate, 4-(3,4-epoxy-5-methylcyclohexyl)butyl 3',4'-epoxycyclohexylcarboxylate, 3,4-epoxycyclohexylethylene oxide, cyclohexylmethyl 3,4-epoxycyclohexylcarboxylate, 3,4-epoxy-6-methylcyclohexylmethyl 6'-methylcyclohexylcarboxylate, bisphenol A diglycidyl ether, tetrabromobisphenol A glycidyl ether, diglycidyl ester of phthalic acid, diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxy tallate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl 2,2-dimethyl-3,4-epoxycyclohexylcarboxylate, n-butyl-2,2-dimethyl-3,4-epoxycyclohexylcarboxylate, cyclohexyl 2-methyl-3,4-epoxycyclohexylcarboxylate, n-butyl-2-isopropyl-3,4-epoxy-5-methylcyclohexylcarboxylate, octadecyl 3,4-epoxycyclohexylcarboxylate, 2-ethylhexyl 3',4'-epoxycyclohexylcarboxylate, 4,6-dimethyl-2,3-epoxycyclohexyl 3',4'-epoxycyclohexylcarboxylate, 4,5-epoxytetrahydrophthalic anhydride, 3-t-butyl-4,5-epoxytetrahydrophthalic anhydride, diethyl 4,5-epoxy-cis-1,2-cyclohexyldicarboxylate, di-n-butyl 3-t-butyl-4,5-epoxy-cis-1,2-cyclohexyldicarboxylate, epoxidized soybean oil, and epoxidized linseed oil.

A single epoxy compound may be used by itself or two or more may be used in combination.

The content of the epoxy compound (D), per 100 mass parts of the polycarbonate resin (A), is preferably 0.0005 to 0.2 mass parts and is more preferably at least 0.001 mass parts, even more preferably at least 0.003 mass parts, and particularly preferably at least 0.005 mass parts and is more preferably not more than 0.15 mass parts, even more preferably not more than 0.1 mass parts, and particularly preferably not more than 0.05 mass parts. When the content of the epoxy compound (D) is less than 0.0005 mass parts, the hue and resistance to thermal discoloration are prone to be inadequate. At more than 0.2 mass parts, not only does the resistance to thermal discoloration deteriorate instead, but the hue and moist thermal stability also readily decline.

[Ratio Between the Contents of the Phosphorus Stabilizer (C) and the Epoxy Compound (D)]

When the epoxy compound (D) is incorporated, the ratio in the polycarbonate resin composition between the contents of the phosphorus stabilizer (C) and the epoxy compound (D) is preferably in the range from 0.5 to 10 as the mass ratio (C)/(D). The hue and particularly the initial YI value are prone to deteriorate when the (C)/(D) mass ratio is less than 0.5, while the resistance to thermal discoloration readily deteriorates when 10 is exceeded. The (C)/(D) mass ratio is more preferably at least 0.7 and even more preferably at least 0.8 and is more preferably not more than 8, even more preferably not more than 7, and particularly preferably not more than 8.

[Additives and the Like]

The polycarbonate resin composition of the present invention may contain additives other than those described above, for example, additives such as antioxidants, mold releasing agents, ultraviolet absorbers, fluorescent whiteners, pigments, dyes, polymers other than polycarbonate resins, flame retardants, impact improvers, antioxidants, plasticizers, compatibilizers, and so forth. A single one of these additives may be incorporated or two or more may be incorporated.

[Method of Producing the Polycarbonate Resin Composition]

There are no limitations on the method for producing the polycarbonate resin composition of the present invention, and the known methods for producing polycarbonate resin compositions may be broadly adopted. An example is a method in which the polycarbonate resin (A), polyalkylene ether glycol (B), phosphorus stabilizer (C), and any other components incorporated on an optional basis are preliminarily blended using any of various mixers, for example, a tumbler or Henschel mixer, followed by melt-kneading with a mixer such as a Banbury mixer, roll, brabender, single-screw extruder, twin-screw extruder, kneader, and so forth. The melt-kneading temperature is not particularly limited, but is commonly in the range from 240 to 320° C.

The polycarbonate resin composition for thin optical components of the present invention exhibits a high spectral transmittance, and its spectral transmittance at a wavelength of 420 nm measured for an optical path-length of 300 mm is a high spectral transmittance of preferably at least 55%, more preferably at least 56%, and even more preferably at least 57%.

The spectral transmittance at a wavelength of 420 nm is the transmittance in a wavelength region in proximity to the wavelength region of the blue LEDs widely used with optical components such as light guide plates; in addition, the yellow tint increases when the transmittance in this wavelength region is low.

The spectral transmittance at a wavelength of 420 nm is measured at an optical path-length of 300 mm using a long path-length molded article (300 mm×7 mm×4 mm) injection-molded and specifically in accordance with the method described in the examples below.

[Polycarbonate Resin Pellet]

The polycarbonate resin composition for thin optical components of the present invention is commonly made into pellets after the melt-kneading of the components as described above. A pellet having an elliptical column shape is preferred for the polycarbonate resin pellet.

FIG. 1 is a schematic view of this polycarbonate resin pellet for thin optical components.

A preferred polycarbonate resin pellet is characterized by a length L in the range from 2.0 to 5.0 mm, a ratio (d/a) between the major diameter d and the minor diameter a of the elliptical cross-section of the pellet in the range from 1.5 to 4, and a minor diameter a of 1.0 to 3.0 mm.

When the length L is not in the range from 2.0 to 5.0 mm, the pellet is prone to breakage and generation of a large amount of fines then readily occurs. When the ratio (d/a) between the major diameter d and minor diameter a is outside the range from 1.5 to 4, the strength of the resin strand readily declines and pellet production by extrusion becomes unstable. When the elliptical minor diameter a is not in the range from 1.0 to 3.0 mm, the pellet is prone to breakage and generation of a large amount of fines then readily occurs.

The ratio (d/a) between the major diameter d and the minor diameter a is preferably at least 1.6, more preferably at least 1.7, and even more preferably at least 1.8, and is preferably not more than 3.5 and more preferably not more than 3.0.

By having such a shape, this polycarbonate resin pellet has the characteristic feature of a suppression of fines generation even when the pellet is filled into, for example, a paper bag or flexible container and is subjected to vibration and load during the transport and delivery of same. It is thought that fines generation is suppressed because the major diameter direction of the elliptical cross-section of the pellet assumes the horizontal and receives the load.

With regard to the amount of fines generated from this polycarbonate resin pellet, the amount of the fines having a particle diameter of equal to or less than 1 mm is preferably not more than 50 ppm when 500 g of the resin pellets is filled in a hermetically sealed 2 liter-capacity polyethylene container having an outer diameter of 125 mm and a total height of 233 mm and this is held in a 50 liter tumbler and rotation is carried out for 20 minutes at a rotation rate of 30 rpm.

[Production of the Polycarbonate Resin Pellet]

Various methods can be used as the method of producing this polycarbonate resin pellet, and a preferred embodiment is described in the following.

The polycarbonate resin is stored in a raw material feeder and from there is fed by a feeder (quantitative feeder) into an extruder from a hopper placed on the extruder. The polycarbonate resin may take the form of pellets or a powder.

Components other than the polycarbonate resin can be blended at any stage prior to introduction into the extruder. For example, all of the components may be blended in a tumbler, Henschel mixer, or blender followed by introduction optionally via a feeder into a hopper chute and feed into the extruder. A single-screw extruder or a twin-screw extruder can be used for the extruder. In addition, feed into the hopper chute may be carried by a separate path from the polycarbonate resin.

The extruder may be a single-screw extruder or a twin-screw extruder, wherein a twin-screw extruder is preferred. The L/D of the screw of the extruder is preferably 10 to 80, more preferably 15 to 70, and even more preferably 20 to 60. Degassing is prone to be deficient when the screw is too short, while the color is prone to deteriorate when the screw is too long.

The polycarbonate resin composition is then extruded in strand form from a extruding nozzle at the end of the extruder. A die having a die orifice with an elliptical shape is preferred for the die of the extruding nozzle. The ellipticity of the pellet can be changed by changing the ellipticity of the elliptical die orifice of the extruding nozzle.

Extrusion is preferably carried out with the die in the extruding nozzle mounted such that the major diameter of the elliptical die orifice is mounted in an approximately horizontal state whereby the major diameter of the extruded strand of elliptical cross-section becomes approximately horizontal. The temperature of the polycarbonate resin immediately after extrusion is generally about 300° C.

The strand having an elliptical cross-section is taken up by a taking-up roller with its major diameter made approximately horizontal and is transported into water held in a cooling water bath and is cooled. In order to minimize deterioration of the resin, the time from extrusion of the strand from the die to entry into the water is preferably short. In general, entry into the water within 1 second after extrusion from the die is favorable.

The cooled strand is transported to a pelletizer by a taking-up roller and is cut to a pellet length of 2.0 to 5.0 mm to provide pellets.

Figure 2:
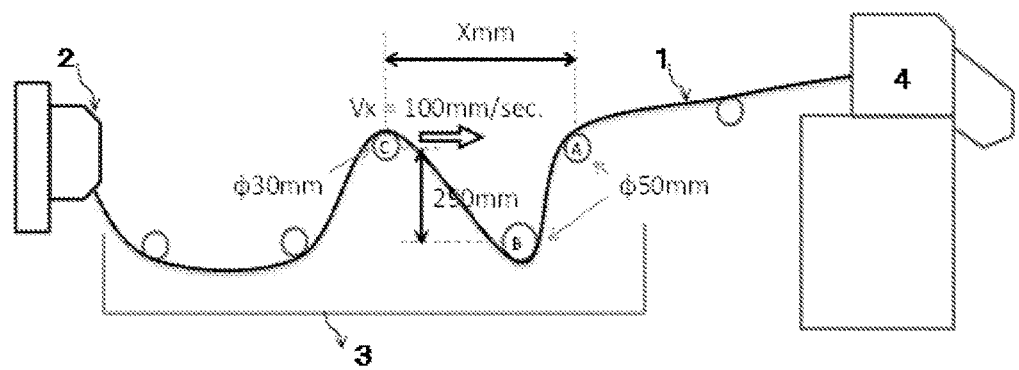
FIG. 2 is a conceptual diagram of a process for producing polycarbonate resin pellet by extruding a strand from an extruder, and of a method for evaluating critical strength.
Figure 3:
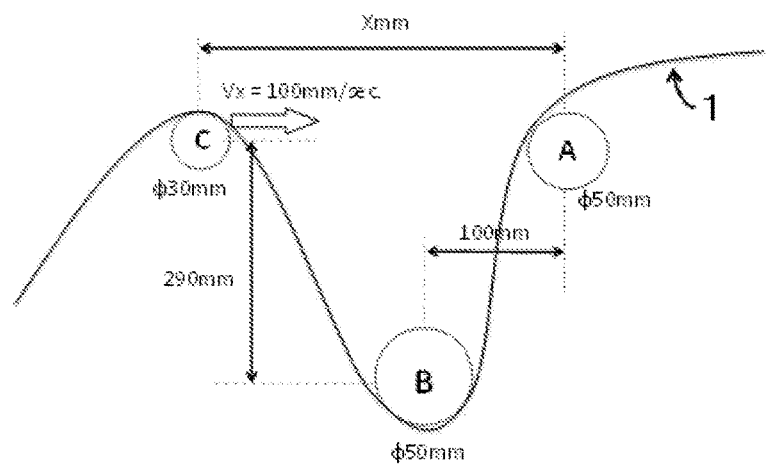
FIG. 3 is a conceptual diagram that shows the details of the method for evaluating critical strength.

FIG. 2 is a conceptual diagram that shows a process of producing polycarbonate resin pellets by extrusion of a strand from an extruder, and FIG. 3 is a conceptual diagram that shows the details of a method for evaluating critical strength.

A strand 1 provided by the extrusion of polycarbonate resin pellets from a extruding nozzle 2 of an extruder is guided into a cooling water bath 3 and is cooled and is thereafter taken up while being successively supported by supports C, B, and A of the taking-up rollers and is transported to a pelletizer 4. At this time, the distance (X mm, also referred to hereafter as the "critical distance") defined as the distance between support C and support A for which strand breakage does not occur during continuous operation for 1 hour or more—at a strand taking-up speed (Vx) of 100 mm/sec and a height difference of 290 mm between support B, which is between C–A, and supports C and A, which support the strand 1 and are at the same height—is preferably equal to or less than 300 mm.

[Thin Optical Components]

The polycarbonate resin composition for thin optical components of the present invention can be used to produce thin optical components by molding, using any of various methods, pellets provided by pelletizing the hereabove-described polycarbonate resin composition. In addition, thin optical components may also be made without going through the pellet stage, by directly molding the resin that has undergone melt-kneading at the extruder.

The polycarbonate resin composition of the present invention is favorably used for the molding of thin optical components by injection molding because it has an excellent fluidity; because it provides an excellent appearance, which is free of white spot foreign material, for the molded article even when molded into a thin molded article; and because it can provide a good balance between the transmittance and hue. With regard to the resin temperature during injection molding, molding is preferably carried out at a resin temperature higher than the 260 to 300° C. temperatures generally used in the injection molding of polycarbonate resins, and a resin temperature of 305 to 380° C. is preferred. The resin temperature is more preferably at least 310° C., even more preferably at least 315° C., and particularly preferably at least 320° C., and is more preferably not more than 370° C. When the resin temperature during molding using conventional polycarbonate resin compositions has been raised in order to mold a thin molded article, the problem has also appeared of the ready occurrence of white spot foreign material on the surface of the molded article. However, the use of the resin composition of the present invention makes it possible to produce, even in the temperature range indicated above, thin molded articles having an excellent appearance.

The resin temperature is understood here to be the barrel set temperature when direct measurement is problematic.

The thin molded article in the present invention generally refers to a molded article that has a plate-shaped part having a thickness of not more than 1 mm and preferably not more than 0.8 mm and more preferably not more than 0.6 mm. This plate-shaped part may be a flat plate or may assume a curved plate configuration; it may have a flat, smooth surface or may have, for example, concave-convex in the surface; and its cross-section, for example, may have a sloping side or may be a wedge-shaped cross-section.

The thin optical component can be exemplified by components for equipment and devices that directly or indirectly utilize a light source such as, for example, an LED, organic EL, incandescent light bulb, fluorescent lamp, cathode tube, and so forth, and typical examples are light guide plates and components for surface light emitters.

A light guide plate is responsible for transmitting the light from a light source, e.g., an LED, in a liquid crystal backlight unit, various display devices, and lighting equipment, and, generally, through concave-convex disposed in its surface, diffuses light entering from its side or back side and outputs a uniform light. Its shape is generally a flat plate shape, and it may or may not have concave-convex on its surface.

The molding of light guide plates is generally carried out preferably by, for example, injection molding methods, ultrahigh speed injection molding methods, and injection compression molding methods.

Light guide plates molded using the resin composition of the present invention are free of cloudiness and free of a reduction in transmittance and have a very good transmittance and hue.

A light guide plate based on the polycarbonate resin composition of the present invention can be advantageously used for liquid crystal backlight units and in various sectors related to display devices and lighting equipment. These devices and equipment can be exemplified by mobile terminals such as cell phones, mobile notebooks, netbooks, slate PCs, tablet PCs, smartphones, and tablet type terminals, and also by cameras, watches and clocks, notebook personal computers, various displays, lighting equipment, and so forth.

EXAMPLES

The present invention is described more specifically by the following examples. However, this should not be construed as limiting the present invention to the following examples.

Examples 1 to 7 and Comparative Examples 1 to 5

The starting materials used are as shown in Table 1 below. The viscosity-average molecular weight of the polycarbonate resin (A) was determined using the following formula and measurement of the intrinsic viscosity [η] at 20° C. in methylene chloride using a Ubbelohde viscometer.

$$[\eta] = 1.23 \times 10^{-4} \times (Mv)^{0.83}$$

TABLE 1

| component | code | |
|---|---|---|
| polycarbonate resin (A) | A1 | aromatic polycarbonate resin for which bisphenol A is a starting material, viscosity-average molecular weight = 14,000 |
| | A2 | aromatic polycarbonate resin for which bisphenol A is a starting material, viscosity-average molecular weight = 12,500 |
| polyalkylene ether glycol compound(B) with formula (1) | B1 | polytetramethylene ether glycol given by HO(CH$_2$CH$_2$CH$_2$CH$_2$O)$_n$H, n = 14, product name: "PTMG1000", from Mitsubishi Chemical Corporation number-average molecular weight = 1,000 |
| | B2 | polytetramethylene ether glycol given by HO(CH$_2$CH$_2$CH$_2$CH$_2$O)$_n$H, n = 28, product name: "PTMG2000", from Mitsubishi |

TABLE 1-continued

| component | code | |
|---|---|---|
| | | Chemical Corporation number-average molecular weight = 2,000 |
| other polyalkylene ether glycol | X1 | poly(2-methyl)ethylene ether glycol given by HO(CH(CH$_3$)CH$_2$O)$_n$H, n = 17 product name: "Uniol D-1000", from NOF Corporation number-average molecular weight = 1,000 |
| | X2 | polyethylene ether glycol given by HO(CH$_2$CH$_2$O)$_n$H, n = 45 product name: "PEG#2000", from NOF Corporation number-average molecular weight = 2,000 |

TABLE 1-continued

| component | code | |
|---|---|---|
| phosphorus stabilizer (C) | C1 | bis(2,6-di-tert-butyl-4-methylphenyl) pentaerythritol diphosphite product name: "Adeka Stab PEP-36", from ADEKA Corporation |
| | C2 | tris(2,4-di-tert-butylphenyl) phosphite product name: "Adeka Stab 2112", from ADEKA Corporation |

[Production of Resin Composition Pellets]

The components indicated above were blended in the proportions (mass parts) given in Tables 2 and 3 and were mixed for 20 minutes with a tumbler and were than melt-kneaded at a cylinder temperature of 240° C. with a vented single-screw extruder ("VS-40" from Tanabe Plastics Machinery Co., Ltd.) having a screw diameter of 40 mm and pellets were obtained by strand cutting.

[Measurement of the Hue (YI) and Light Transmittance]

The obtained pellets were dried for 5 to 7 hours at 120° C. using a hot air current circulation drier followed by the molding of a long path-length molded article (300 mm×7 mm×4 mm) at a resin temperature of 340° C. and a mold temperature of 80° C. using an injection molding machine ("EC100SX-2A" from Toshiba Machine Co., Ltd.).

The YI (yellow index) at an optical path-length of 300 mm and the spectral transmittance (unit: %) at a wavelength of 420 nm were measured using this long path-length molded article. A long path-length transmission spectrophotometer ("ASA 1" from Nippon Denshoku Industries Co., Ltd., light source C, 2° field) was used for the measurements.

The results of these evaluations are given in the following Tables 2 and 3.

TABLE 2

| | | examples | | | | | | |
|---|---|---|---|---|---|---|---|---|
| component | code | 1 | 2 | 3 | 4 | 5 | 6 | 7 |
| polycarbonate resin (A) | A1 | 100 | 100 | 100 | 100 | 100 | 100 | |
| | A2 | | | | | | | 100 |
| polyalkylene ether glycol compound(B) with formula (1) | B1 | 0.5 | | 0.5 | 0.81 | 1.01 | 1.52 | 0.81 |
| | B2 | | 0.5 | | | | | |
| phosphorus stabilizer (C) | C1 | 0.05 | 0.05 | | 0.05 | 0.05 | 0.05 | 0.05 |
| | C2 | | | 0.05 | | | | |
| YI (300 mt) | | 15.7 | 15.7 | 15.4 | 14.1 | 13.6 | 13.6 | 14.9 |
| 420 nm transmittance (%) | | 57.1 | 57.6 | 57.6 | 58.7 | 59.7 | 60.1 | 58.2 |

TABLE 3

| | | comparative examples | | | |
|---|---|---|---|---|---|
| component | code | 1 | 2 | 3 | 4 |
| polycarbonate resin (A) | A1 | 100 | 100 | 100 | 100 |
| | A2 | | | | |
| polyalkylene ether glycol compound(B) with formula (1) | B1 | 0.05 | | | |
| | B2 | | | | |
| other polyalkylene ether glycol | X1 | | | 0.5 | |
| | X2 | | | | 0.5 |

TABLE 3-continued

|  |  | comparative examples | | | |
|---|---|---|---|---|---|
| component | code | 1 | 2 | 3 | 4 |
| phosphorus stabilizer (C) | C1 C2 | 0.05 | 0.05 | 0.05 | 0.05 |
| YI (300 mt) |  | 19.4 | 17.4 | 18.4 | 23.8 |
| 420 nm transmittance (%) |  | 50.7 | 53.7 | 51.1 | 42.7 |

Comparative Example 5

An investigation of pelletization was carried out by the same method as in Example 1, but changing component B1 in Example 1 to 4 mass parts; however, strand scission occurred frequently during melt-kneading at the extruder and the production of pellets of the resin composition was strongly impaired.

As is clear from Table 2, the molded articles of the examples exhibit a small YI and little yellowing at a long optical path-length of 300 mm. Moreover, the light transmittance at 420 nm is also high and the transparency is excellent.

The comparative examples in Table 3, on the other hand, are shown to have a YI at 300 mm that is inferior to that for the examples. The light transmittance is also low.

Examples 8 to 14, Comparative Examples 6 and 7, and Reference Examples 1 to 3

The starting materials used are as shown in Table 4 below.

TABLE 4

| component | code | |
|---|---|---|
| polycarbonate resin (A) | A1 | aromatic polycarbonate resin for which bisphenol A is a starting material, viscosity-average molecular weight = 14,000 |
|  | A2 | aromatic polycarbonate resin for which bisphenol A is a starting material, viscosity-average molecular weight = 12,500 |
| polyalkylene ether glycol compound (B) with formula (1) | B1 | polytetramethylene ether glycol given by HO(CH$_2$CH$_2$CH$_2$CH$_2$O)$_n$H, n = 14, product name: "PTMG1000", from Mitsubishi Chemical Corporation number-average molecular weight = 1,000 |
|  | B2 | polytetramethylene ether glycol given by HO(CH$_2$CH$_2$CH$_2$CH$_2$O)$_n$H, n = 28, product name: "PTMG2000", from Mitsubishi Chemical Corporation number-average molecular weight = 2,000 |
| phosphorus stabilizer (C) | C1 | bis(2,6-di-tert-butyl-4-methylphenyl) pentaerythritol diphosphite product name: "Adeka Stab PEP-36", from ADEKA Corporation |
|  | C3 | bis(2,4-dicumylphenyl) pentaerythritol diphosphite, product name: "Doverphos S-9228PC", from Dover Chemical Corporation |
| epoxy compound (D) | D1 | 3,4-epoxycyclohexylmethyl 3',4'-epoxycyclohexanecarboxylate, product name: "Celloxide 2021P", from Daicel Corporation |
|  | D2 | bisphenol A diglycidyl ether, product name: "Adeka Cizer EP-17", from ADEKA Corporation |

[Production of Resin Composition Pellets]

The components indicated above were blended in the proportions (mass parts) given in Tables 5 and 6 and were mixed for 20 minutes with a tumbler and were than melt-kneaded at a cylinder temperature of 240° C. with a vented single-screw extruder ("VS-40" from Tanabe Plastics Machinery Co., Ltd.) having a screw diameter of 40 mm and pellets were obtained by strand cutting.

[Measurement of the Hue (YI) and Light Transmittance]

The obtained pellets were dried for 5 to 7 hours at 120° C. using a hot air current circulation drier followed by the molding of a long path-length molded article (300 mm×7 mm×4 mm) at a resin temperature of 340° C. and a mold temperature of 80° C. using an injection molding machine ("EC100SX-2A" from Toshiba Machine Co., Ltd.).

The YI (yellow index) (the "initial YI" in the following) at an optical path-length of 300 mm and the spectral transmittance (unit: %) at a wavelength of 420 nm were measured using this long path-length molded article. A long path-length transmission spectrophotometer ("ASA 1" from Nippon Denshoku Industries Co., Ltd., light source C, 2° field) was used for the measurements.

In addition, the long path-length molded article was held for 800 hours at 85° C.; the YI (post-treatment YI) at an optical path-length of 300 mm was subsequently measured; and the difference in the YI values (ΔYI=post-treatment YI−initial YI) was determined.

The results of these evaluations are given in the following Tables 5 and 6.

TABLE 5

|  |  | examples | | | | | | |
|---|---|---|---|---|---|---|---|---|
| component | code | 8 | 9 | 10 | 11 | 12 | 13 | 14 |
| polycarbonate resin (A) | A1 | 100 | 100 | 100 | 100 | 100 | 100 | 100 |
|  | A2 |  |  |  |  |  |  |  |
| polyalkylene ether glycol compound(B) with formula (1) | B1 | 1.01 | 1.01 |  | 1 | 1.01 | 1.01 | 1.01 |
|  | B2 |  |  | 1.01 |  |  |  |  |
| phosphorus stabilizer (C) | C1 | 0.01 | 0.03 | 0.03 |  | 0.05 | 0.05 | 0.05 |
|  | C3 |  |  |  | 0.04 |  |  |  |
| epoxy compound (D) | D1 | 0.01 | 0.01 | 0.01 | 0.01 | 0.01 |  |  |
|  | D2 |  |  |  |  |  | 0.01 | 0.05 |
| (C)/(D) mass ratio |  | 1 | 3 | 3 | 4 | 5 | 5 | 1 |
| initial YI |  | 13.9 | 13.7 | 14.1 | 13.4 | 13.6 | 14.4 | 14.3 |
| ΔYI (85° C., 800 hr) |  | 3.7 | 2.8 | 3.1 | 3.2 | 3.1 | 3.4 | 2.9 |
| 420 nm transmittance (%) |  | 59.7 | 60.1 | 59.4 | 60.6 | 60.2 | 58.9 | 59.0 |

TABLE 6

| component | code | comparative examples | | reference examples | | |
|---|---|---|---|---|---|---|
| | | 6 | 7 | 1 | 2 | 3 |
| polycarbonate resin (A) | A1 | 100 | 100 | 100 | 100 | 100 |
| | A2 | | | | | |
| polyalkylene ether glycol compound(B) with formula (1) | B1 | | 1.01 | 1.01 | 1.01 | 1.01 |
| | B2 | | | | | |
| phosphorus stabilizer(C) | C1 | 0.05 | | 0.05 | 0.002 | 0.15 |
| | C3 | | | | | |
| epoxy compound (D) | D1 | | 0.01 | | 0.01 | 0.01 |
| | D2 | | | | | |
| (C)/(D) mass ratio | | — | — | — | 0.2 | 15 |
| initial YI | | 23.8 | 15.9 | 13.6 | 22.1 | 14.8 |
| ΔYI (85° C., 800 hr) | | 2.0 | 2.4 | 4.6 | 2.6 | 4.3 |
| 420 nm transmittance (%) | | 42.8 | 56.3 | 59.7 | 45.7 | 58.2 |

As is clear from Table 5 above, the thin molded articles of the examples containing the epoxy compound (D) exhibit a small initial YI at a long optical path-length of 300 mm and exhibit an excellent hue. Moreover, it is shown that there is little increase in the YI value after the heat treatment and thus that the resistance to thermal discoloration is excellent.

Example 15

The components indicated in Table 1 were blended in the proportions (mass parts) given for Example 5 in Table 2 and were mixed for 20 minutes in a tumbler followed by continuous feed to a vented twin-screw extruder ("TEX44αII" from Japan Steel Works, Ltd.) from the hopper of the extruder and melt-mixing in the extruder and extrusion under the following extrusion conditions: cylinder temperature=240° C., extruding rate=150 kg/h, and screw rotation rate=250 rpm. The extrusion was carried out from an extrusion nozzle provided with a die having an elliptical die orifice with a major diameter of 6.5 mm and a minor diameter of 3.5 mm with its major diameter made horizontal, and was carried out into a strand shape with the major diameter of the elliptical cross-section thereof made approximately horizontal. Polycarbonate resin pellets were obtained by introduction into a cooling water bath and then cutting at a pelletizer at a strand taking-up speed of 40 m/min and a cutter blade rotation rate of 600 rpm.

(1) Major Diameter/Minor Diameter Ratio of the Pellet Elliptical Cross-Section

The major diameter, minor diameter, and length of the obtained pellets were measured, and the average value for 100 of each was obtained. The average value of the major diameter/minor diameter ratio was used for the pellet ellipticity.

The major diameter of the pellet was 2.9 mm and its minor diameter was 1.5 mm, and the pellet had a length of 2.9 mm and a major diameter/minor diameter ratio of 1.9.

(2) Strand Stability

In order to prevent the direction of extrusion of the strand exiting the die from meandering unpredictably, the strand is made to extrude straight ahead by pressing a support against the strand and applying a constant load.

Using this condition, the stability of extrusion was evaluated by counting the number of times the strand broke per 1 hour.

The number of strand breaks was zero.

(3) Critical Strength of the Strand

The critical strength of the strand was evaluated by the following method.

As shown in FIG. 2, a resin strand provided by the extrusion of the obtained polycarbonate resin pellets from the extruder is transported to a pelletizer from support C while being supported by support B and support A. As shown in detail in FIG. 3, the critical strength of the resin strand was evaluated as the distance (X mm) between support C and support A, which have the same height, for which strand breakage did not occur during continuous operation for at least 1 hour at a strand taking-up speed (Vx) of 100 mm/sec and a height difference of 290 mm between support B and supports C and A which supported the strand and were at the same height. The critical distance between the supports was 260 mm.

(4) Measurement of the Amount of Fines Production by a Shaking Test 500 g of the obtained polycarbonate resin pellets was filled in a hermetically sealed 2 liter-capacity polyethylene container having an outer diameter of 125 mm and a total height of 233 mm; this was fixed in a 50 liter tumbler ("SKD-50" from Seiwa Ironworks Co., Ltd.); and rotation was carried out for 20 minutes at a rotation rate of 30 rpm to create a situation in which fines would be generated by rubbing the pellets against each other.

The amount of fines was measured as follows: after the shaking test, the 500 g of pellets was introduced into 1 liter of a liquid provided by mixing water and ethyl alcohol at 1:1 and this was thoroughly stirred; then, the supernatant containing the fines from the pellets was filtered using filter paper and the filter paper was subsequently dried for 2 hours in a 120° C. oven and the mass was measured; and the amount of attached fines (mass-ppm) was calculated from the net increase in the mass of the filter paper and this was taken to be the amount of fines production. The particle diameter of the fines in this measurement is equal to or less than 1 mm.

The amount of fines production was 35 mass-ppm.

(5) White Spot Defects 100 mm×100 mm×thickness 0.4 mm thin flat plates were molded at a temperature of 340° C. using the obtained polycarbonate resin pellets and an injection molding machine ("EC100SX-2A" from Toshiba Machine Co., Ltd.), and the number of plates in which white spot defects were produced per 10 plates was counted.

The white spot defect count was zero.

(6) Vacuum Voids 100 of the obtained polycarbonate resin pellets were visually inspected and the number of pellets in which vacuum voids were present was counted.

The number of pellets in which vacuum voids were present was zero.

Example 16

The components indicated in Table 1 were blended in the proportions (mass parts) given for Example 7 in Table 2 and were mixed for 20 minutes in a tumbler followed by continuous feed to a vented twin-screw extruder ("TEX44αII" from Japan Steel Works, Ltd.) from the hopper of the extruder and melt-mixing in the extruder and extrusion under the following extrusion conditions: cylinder temperature=240° C., extruding rate=150 kg/h, and screw rotation rate=250 rpm. The extrusion was carried out from an extrusion nozzle provided with a die having an elliptical die orifice with a major diameter of 6.5 mm and a minor diameter of 2.9 mm with its major diameter made horizontal, and was carried out into a strand shape with the major diameter of the elliptical cross-section thereof made approximately horizontal. Polycarbonate resin pellets were obtained by introduction into a water bath and then cutting at a pelletizer at a strand taking-up speed of 40 m/min and a cutter blade rotation rate of 600 rpm.

The major diameter of the pellet was 2.9 mm and its minor diameter was 1.2 mm, and the pellet had a length of 3.2 mm and a major diameter/minor diameter ratio of 2.4.

The number of strand breaks was zero and the critical distance between supports was 270 mm. The amount of generated fines was 34 mass-ppm; the white spot defect count was zero; and the number of pellets in which vacuum voids were present was zero.

Example 17

The components indicated in Table 4 were blended in the proportions (mass parts) given for Example 9 in Table 5 and were mixed for 20 minutes in a tumbler followed by continuous feed to a vented twin-screw extruder ("TEX44αII" from Japan Steel Works, Ltd.) from the hopper of the extruder and melt-mixing in the extruder and extrusion under the following extrusion conditions: cylinder temperature=240° C., extruding rate=150 kg/h, and screw rotation rate=250 rpm. The extrusion was carried out from an extrusion nozzle provided with a die having an elliptical die orifice with a major diameter of 6.5 mm and a minor diameter of 3.5 mm with its major diameter made horizontal, and was carried out into a strand shape with the major diameter of the elliptical cross-section thereof made approximately horizontal. Polycarbonate resin pellets were obtained by introduction into a water bath and then cutting at a pelletizer at a strand taking-up speed of 40 m/min and a cutter blade rotation rate of 600 rpm.

The major diameter of the pellet was 2.9 mm and its minor diameter was 1.5 mm, and the pellet had a length of 2.9 mm and a major diameter/minor diameter ratio of 1.9.

The number of strand breaks was zero and the critical distance between supports was 260 mm. The amount of generated fines was 35 mass-ppm; the white spot defect count was zero; and the number of pellets in which vacuum voids were present was zero.

INDUSTRIAL APPLICABILITY

The polycarbonate resin composition of the present invention has a very good transmittance and hue and an excellent resistance to thermal discoloration and can therefore be very advantageously used for thin optical components and thus has a very high industrial applicability.

The invention claimed is:

1. A polycarbonate resin pellet, comprising an elliptical column-shaped pellet formed from a polycarbonate resin composition, and having
 a length of 2.0 to 5.0 mm,
 a major diameter/minor diameter ratio for an elliptical cross-section of 1.5 to 4, and
 a minor diameter of 1.0 to 3.0 mm,
the polycarbonate resin composition comprising:
100 mass parts of a polycarbonate resin (A);
0.1 to 2 mass parts of a polyalkylene ether glycol polymer or copolymer (B) represented by general formula (1):

wherein:
X and Y each are independently a hydrogen atom or a $C_{1-22}$ aliphatic acyl group or alkyl group;
m is an integer from 3 to 6; and
n is an integer from 6 to 100; and
0.005 to 0.5 mass parts of a phosphorus stabilizer (C);
wherein an amount of fines having a particle diameter of not more than 1 mm generated by the polycarbonate resin pellets after rotation for 20 minutes at a rotation rate of 30 rpm, when 500 g of the polycarbonate resin pellet is filled in a hermetically sealed 2 liter-capacity polyethylene container having an outer diameter of 125 mm and a total height of 233 mm, and the container is held in a 50 liter tumbler and is rotated, is not more than 50 ppm.

2. The polycarbonate resin pellet of claim 1, wherein said polycarbonate resin composition further comprises:
 0.0005 to 0.2 mass parts of an epoxy compound (D),
 wherein a mass ratio (C)/(D) of the phosphorus stabilizer (C) and the epoxy compound (D) is 0.5 to 10.

3. The polycarbonate resin pellet of claim 1, wherein the viscosity-average molecular weight (Mv) of the polycarbonate resin (A) is 10,000 to 15,000.

4. The polycarbonate resin pellet of claim 1, wherein the viscosity-average molecular weight (Mv) of the polycarbonate resin (A) is 11,000 to 14,500.

5. The polycarbonate resin pellet of claim 1, wherein the polyalkylene ether glycol polymer or copolymer (B) is a polytetramethylene ether glycol.

6. The polycarbonate resin pellet of claim 1, wherein the phosphorus stabilizer (C) is a stabilizer having a pentaerythritol diphosphite structure.

7. The polycarbonate resin pellet of claim 1, wherein a spectral transmittance of the polycarbonate resin composition, at a wavelength of 420 nm measured at an optical path-length of 300 mm, is at least 55%.

8. A thin optical component obtained by molding the polycarbonate resin pellet of claim 1.

9. The thin optical component of claim 8, comprising a light guide plate having a thickness of not more than 1 mm.

10. The polycarbonate resin pellet of claim 1, wherein the viscosity-average molecular weight (Mv) of the polycarbonate resin (A) is 11,500 to 14.000.

11. The polycarbonate resin pellet of claim 1, wherein n is an integer from 10 to 90.

12. The polycarbonate resin pellet of claim 10, wherein n is an integer from 10 to 90.

* * * * *